United States Patent
Tsu et al.

(10) Patent No.: US 11,803,697 B2
(45) Date of Patent: Oct. 31, 2023

(54) METHOD AND SYSTEM FOR LABELING AND ORGANIZING DATA FOR SUMMARIZING AND REFERENCING CONTENT VIA A COMMUNICATION NETWORK

(71) Applicant: PowerNotes LLC, Chicago, IL (US)

(72) Inventors: Wilson Tsu, Chicago, IL (US); Srujani Pagidipati, Chicago, IL (US)

(73) Assignee: PowerNotes LLC, Chicago, IL (US)

( * ) Notice: Subject to any disclaimer, the term of this patent is extended or adjusted under 35 U.S.C. 154(b) by 0 days.

(21) Appl. No.: 16/536,160

(22) Filed: Aug. 8, 2019

(65) Prior Publication Data
US 2019/0361968 A1 Nov. 28, 2019

Related U.S. Application Data

(63) Continuation of application No. 14/215,843, filed on Mar. 17, 2014.

(60) Provisional application No. 61/793,717, filed on Mar. 15, 2013.

(51) Int. Cl.
G06F 40/169 (2020.01)
G06F 16/38 (2019.01)

(52) U.S. Cl.
CPC .......... *G06F 40/169* (2020.01); *G06F 16/382* (2019.01)

(58) Field of Classification Search
CPC ...................................................... G06F 17/24
See application file for complete search history.

(56) References Cited

U.S. PATENT DOCUMENTS

| | | |
|---|---|---|
| 5,179,649 A | 1/1993 | Masuzaki et al. |
| 5,924,105 A | 7/1999 | Punch et al. |
| 6,964,013 B1 | 11/2005 | Ono et al. |
| 8,081,750 B1 * | 12/2011 | Ehlinger ............ H04M 1/2757 379/355.02 |
| 8,655,404 B1 | 2/2014 | Singh et al. |
| 9,268,858 B1 * | 2/2016 | Yacoub ............ G06F 16/24573 |
| 2002/0145626 A1 | 10/2002 | Richards et al. |
| 2002/0167548 A1 | 11/2002 | Murray |
| 2003/0206189 A1 * | 11/2003 | DeMello ............... G06F 3/0482 715/711 |

(Continued)

OTHER PUBLICATIONS

PC World, internet publication, Oct. 7, 2008, PC World, internet publication, Oct. 7, 2008 pp. 1-8.*

(Continued)

*Primary Examiner* — Justin S Lee
(74) *Attorney, Agent, or Firm* — Husch Blackwell LLP

(57) ABSTRACT

Systems and methods of the present technology generally provide computer implemented assistance for data summary, including organizing and generating a summary of data selected from source documents. User-identified information may be selected from one or more source documents at a user device, in response to which a unique identifier selection box may be displayed at the user device. A unique identifier may be selected from the unique identifier selection box. A first data set and/or a request for generation of a summary set may be sent to a system server via a communication link, the first data set may include the unique identifier and the user-identified information. The user device may then receive a generated summary via the communication link and may display the summary.

14 Claims, 9 Drawing Sheets

The issue is, what is chicken? Plaintiff says "chicken" means a young chicken, suitable for broiling and frying. Defendant says "chicken" means any bird of that genus that meets contract specifications on weight and quality, including what it calls "stewing chicken" and ⌐302 plaintiff pejoratively terms "fowl". Dictionaries give both meanings, as well as some others not relevant here. To support its, plaintiff sends a number of volleys over the net; defendant essays to return them and adds a few serves of its own. Assuming that both parties were acting in good faith, the case nicely illustrates Holmes' remFACT ing of a contract depends not on the agreement of twISSUE intention, but on the agreement of two sets of extePROCEDURE REASONING →300 the parties' having meant the same thing but on thRULE same thing." The Path of the Law, in Collected LeHOLDING have concluded that plaintiff has not sustained its NOTES persuasion that the contract used "chicken" in the narrower sense.⌐304

The action is for breach of the warranty that goods sold shall correspond to the description, New York Personal Property Law, McKinney's Consol. Laws, c. 41, § 95. Two contracts are in suit. In the first, dated May 2, 1957, defendant, a New York sales corporation, confirmed the sale to plaintiff, a Swiss corporation, of

(56) References Cited

U.S. PATENT DOCUMENTS

| | | | | |
|---|---|---|---|---|
| 2004/0015539 A1* | 1/2004 | Alegria | G06F 40/166 | 709/203 |
| 2005/0039141 A1* | 2/2005 | Burke | G06F 3/0482 | 715/845 |
| 2005/0278293 A1* | 12/2005 | Imaichi | G06F 16/93 | |
| 2006/0026495 A1* | 2/2006 | Shaw | G06F 40/166 | 715/250 |
| 2006/0047770 A1* | 3/2006 | Marappan | G06Q 10/107 | 709/207 |
| 2007/0022386 A1* | 1/2007 | Boss | G06F 9/543 | 715/764 |
| 2007/0233692 A1* | 10/2007 | Lisa | G06F 3/0488 | |
| 2007/0266342 A1* | 11/2007 | Chang | G06F 16/9535 | 715/810 |
| 2008/0214215 A1* | 9/2008 | Aaltonen | G06F 16/9577 | 455/466 |
| 2009/0113306 A1 | 4/2009 | Fujishita et al. | | |
| 2009/0287671 A1 | 11/2009 | Bennett | | |
| 2010/0251295 A1* | 9/2010 | Amento | H04N 21/6587 | 725/38 |
| 2011/0117063 A1 | 5/2011 | Klimanskaya et al. | | |
| 2011/0289105 A1* | 11/2011 | Hershowitz | G06F 40/169 | 707/769 |
| 2012/0036423 A1* | 2/2012 | Haynes, II | G06Q 30/0201 | 715/230 |
| 2012/0221954 A1 | 8/2012 | Tanaka | | |
| 2013/0060799 A1* | 3/2013 | Massand | G06F 40/00 | 707/758 |
| 2013/0246901 A1* | 9/2013 | Massand | G06F 40/197 | 715/229 |
| 2014/0028592 A1 | 1/2014 | Wang et al. | | |
| 2014/0032633 A1* | 1/2014 | Kleppner | G06F 40/169 | 709/202 |
| 2014/0143661 A1* | 5/2014 | Carreno-Fuentes | G06F 40/117 | 715/255 |
| 2014/0157163 A1* | 6/2014 | Strutin-Belinoff | G06F 3/04883 | 715/769 |
| 2014/0215008 A1* | 7/2014 | Wiles | G06F 16/972 | 709/217 |
| 2014/0281936 A1 | 9/2014 | Wallis et al. | | |

OTHER PUBLICATIONS

Screen captures from YouTube video clip entitled "Widget Video Demonstration," 3 pages, uploaded on Aug. 25, 2010 by user "Sterling Miller". Retrieved from Internet: <http://www.youtube.com/widgetdemo>.*

Miller NPL, "How to select text in Microsoft Word" (https://www.youtube.com/watch?v=zNXZDOcSOVM), Aug. 25, 2010.

Microsoft Community, May 19, 2011, Microsoft forum, 1-5, http://answers.microsoft.com/enus/ office/forum/officeversion otherword/canisplitmyscreenandworkontwodocumentsat/996b8be52082e0119b4b68b599b31bf5?.

* cited by examiner

The issue is, what is chicken? Plaintiff says "chicken" means a young chicken, suitable for broiling and frying. Defendant says "chicken" means any bird of that genus that meets contract specifications on weight and quality, including what it calls "stewing chicken" and plaintiff pejoratively terms "fowl". Dictionaries give both meanings, as well as some others not relevant here. To support its, plaintiff sends a number of volleys over the net; defendant essays to return them and adds a few serves of its own. Assuming that both parties were acting in good faith, the case nicely illustrates Holmes' remark "that the making of a contract depends not on the agreement of two minds in one intention, but on the agreement of two sets of external signs - not on the parties' having meant the same thing but on their having said the same thing." The Path of the Law, in Collected Legal Papers, p. 178. I have concluded that plaintiff has not sustained its burden of persuasion that the contract used "chicken" in the narrower sense.

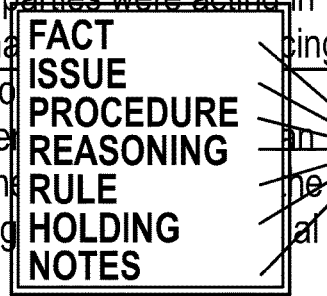

302
300
304

The action is for breach of the warranty that goods sold shall correspond to the description, New York Personal Property Law, McKinney's Consol. Laws, c. 41, § 95. Two contracts are in suit. In the first, dated May 2, 1957, defendant, a New York sales corporation, confirmed the sale to plaintiff, a Swiss corporation, of

FIGURE 4 earned from other employment.• However, before projected earnings from other employment opportunities not sought or accepted by the discharged employee can be applied in mitigation, the employer must show that the other employment was comparable, or substantially similar, to that of which the employee has been deprived; the employee's rejection of or failure to seek other available employment of a different or inferior kind may not be resorted to in order to mitigate damages.••

In the present case defendant has raised no issue of reasonableness of efforts by plaintiffs to obtain other employment; the sole issue is whether plaintiff's refusal of defendant's substitute offer of "Big Country" may be used in mitigation. Nor, if the "Big Country" offer was of employment different or inferior when compared with the original "Bloomer Girl" employment, is there an issue as to whether or not plaintiff acted reasonably in refusing the substitute offer. Despite defendant's arguments to the contrary, no case cited or which our research has discovered holds or suggests that reasonableness is an element of a wrongfully discharged employee's option to reject, or fail to seek, different or inferior employment lest the possible earnings therefrom be charged against him in mitigation of damages.[5]

(6) Applying the foregoing rules to the record in the present case, with all intendments in favor of the party opposing the summary judgment motion - here, defendant - it is clear that the trial court correctly ruled that plaintiff's failure to accept defendant's tendered substitute employment could not be applied in mitigation of damages because the offer of the "Big Country" lead was of employment both different and inferior, and that no factual dispute was presented on that issue.

The mere circumstance that Bloomer Girl was to be a musical review calling upon plaintiff's talents as a dance as well as an actress and was to be produce in the City of Los Angeles, whereas Big Country was a straight dramatic role in a Western Type story taking place in an opal mine in Australia, demonstrates the difference in kind between the two employments; the female lead as a dramatic actress in a western style motion picture can by no stretch of imagination be considered the equivalent of or substantially similar to the lead in a song and dance production.

(7) Additionally the substitute Big Country offer proposed to eliminate or impair the director and screenplay approvals accorded to

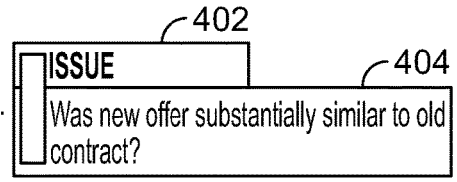
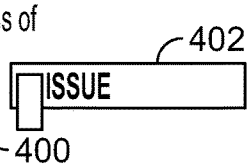
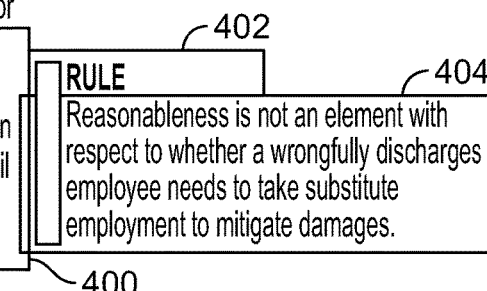
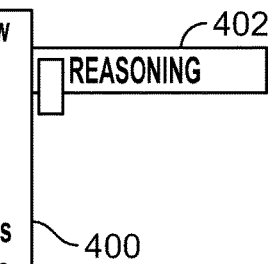
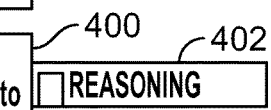

Issues ⌐504

| Was new offer substantially similar to old contract? | ⌐506

"However, before projected earnings from other employment opportunities not sought or accepted by the discharged employee can be applied in mitigation, the employer must show that the other employment was comparable, or substantially similar, to that of which the employee has been deprived the employee's rejection of a failure to seek other available employment of a different or inferior kind may not be resorted to in order to mitigate damages."

"The sole issue is whether plaintiff's refusal of defendant's is substitute offer of "Big Country" may be used in mitigation."

⌐502

Procedure

⌐502

Reasoning
⌐506

"The mere circumstance that "Bloomer Girl" was to be a musical review calling upon plaintiff's talents as a dancer as well as an actress, and was to be produced in the City of Los Angeles whereas "Big Country" was a straight dramatic role in a "Western Type" story taking place in an opal mine in Australia, demonstrates the difference in kind between the two employments, the female lead as a dramatic actress in a western style motion picture can by no stretch of imagination be considered the equivalent of or substantially similar to the lead in a song-and-dance production"

"Additionally, the substitute "Big Country" offer proposed to eliminate or impair the director and screenplay approvals accorded to plaintiff's under the original "Blommer Girl" contract (see in 2 anle), and thus constituted an offer of inferior employment"

⌐502

Rule
⌐504

Reasonableness is not an element with respect to whether a wrongfully discharged employee needs to take substitute employment to mitigate dama "Despite defendant's arguments to the contrary, no case cited or which our research has discovered holds or suggests that reasonableness is an element of a wrongfully discharged employee's option to reject, or fail to seek, different or inferior employment test the possible earnings therefrom be charged against him in mitigation of damages.[5]"

⌐506

⌐502

Holding

FIGURE 6

METHOD AND SYSTEM FOR LABELING AND ORGANIZING DATA FOR SUMMARIZING AND REFERENCING CONTENT VIA A COMMUNICATION NETWORK

RELATED APPLICATIONS

This application is a continuation of U.S. patent application Ser. No. 14/215,843 filed on Mar. 17, 2014, currently pending, which claims priority to U.S. Provisional Application Ser. No. 61/793,717, filed on Mar. 15, 2013, the disclosure of which is hereby incorporated by reference in its entirety.

FIELD OF THE INVENTION

The present technology generally relates to computer-aided data summary systems and methods that assist users with analyzing data and, more particularly, to a method and system for obtaining, analyzing, labeling, organizing, combining, modifying, and/or summarizing data using single- and multi-action operations.

DESCRIPTION OF RELATED ART

Professionals and students often require the analysis and manipulation of data and information. Such individuals may practice or study in, without limitation, the fields of law, business, finance, medicine, legal education, business education, medical education, graduate education, undergraduate education, and K-12 education.

Existing technology generally requires users to: (i) either obtain pre-sorted data in excess of usability requirements or manually search for, gather, and organize multiple documents from various sources, (ii) obtain and utilize several tools to label and annotate such data, and/or (iii) manually organize, integrate, and summarize the original data with user-created data.

A need exists for a system and/or method that organizes information from multiple sources, allows users to easily and efficiently label such information, allows users to modify such information, allows users to combine and separate such information with other information, and displays all such information in a user-friendly format. Such a system, by automating and streamlining many labor-intensive steps involved in the above processes, would reduce the amount of work for and increase the efficiency of, users.

The systems and methods of the present technology can be used to automate and streamline many of these steps involved in these processes, through, but not limited to, single-action functionality.

SUMMARY OF THE INVENTION

Examples of the present technology can include components of a cloud-based (or other Internet-based) or device-based {such as a personal computer, tablet, smartphone, or other device) platform that provides a user with a streamlined interface/display with the functionality to display, label, organize, integrate, modify, and/or summarize information. Additional functionality includes, but is not limited to, simplified information selection, copying, cutting and pasting labeling/tagging, separation of annotations from information, integration of information, sorting through and displaying similar information or distinguishing dissimilar information, and other functions, either through single-action operation or otherwise, to provide an efficient user experience.

In one aspect, a data summary system is provided that includes a user device coupled to a communication link. The user device may include a user device memory configured to store program instructions and a user device processor configured to execute the program instructions. When executed, the program instructions may cause the user device processor to detect selection of user-identified information from a source document, the user-identified information including highlighted text. The program instructions may cause the user device processor to display a unique identifier selection box in response to the selection of the user-identified information, the unique identifier selection box including a plurality of unique identifiers. The program instructions may cause the user device processor to detect selection of a unique identifier from the unique identifier selection box. The program instructions may cause the user device processor to associate the user-identified information with the unique identifier in response to the selection of the unique identifier. The program instructions may cause the user device processor to send a first data set to a system server via the communication link, the first data set including a user identifier, the user-identified information, and the unique identifier. The program instructions may cause the user device processor to send a request for generation of a summary to the system server via the communication link. The program instructions may cause the user device processor to receive the summary from the system server via the communication link in response to the request, the summary including the unique identifier and the user-identified information. The program instructions may cause the user device processor to display the summary.

Additionally, or alternatively, the program instructions may cause the user device processor to perform an initial interaction with the system server via the communication link. The program instructions may cause the user device processor to receive a user identifier from the system server in response to performing the initial interaction, wherein the user identifier associates the user device with a user profile stored at the system server. The program instructions may cause the user device processor to send hyper-text transfer protocol (HTTP) requests to the system server via the communication link. The program instructions may cause the user device processor to receive requested web pages from the system server via the communication link, the requested web pages being defined in the HTTP requests. The program instructions may cause the user device processor to determine that custom information has been input via an input device of the user device, wherein the first data set further includes the custom information, the custom information is associated with the unique identifier, and the summary includes the custom information listed under the unique identifier. A location at which the custom information is listed in the summary may be prioritized relative to the user-identified information, such that the custom information is listed above the user-identified information in the summary. The user-identified information of the summary may be linked to corresponding original information of the source document. The program instructions may cause the user device processor to display the original information of the source document adjacent to the summary in a split-screen display. The program instructions may cause the user device processor to determine that a single mouse click has been performed at an input device of the user device, wherein the request is sent in response to the single mouse click.

In another aspect, a method is provided that can be implemented by a data summary system. The method may include a step for detecting, by a user device processor of a user device, selection of user-identified information from a source document, the user-identified information including highlighted text. The method may include a step for displaying, by the user device processor via a screen of the user device, a unique identifier selection box in response to the selection of the user-identified information, the unique identifier selection box including a plurality of unique identifiers. The method may include a step for detecting, by the user device processor, selection of a unique identifier from the unique identifier selection box. The method may include a step for associating, by the user device processor, the user-identified information with the unique identifier in response to the selection of the unique identifier. The method may include a step for sending, by the user device processor to a system server via a communication link, a first data set including a user identifier, the user-identified information, and the unique identifier. The method may include a step for sending, by the user device processor to the system server via the communication link, a request for generation of a summary to the system server via the communication link. The method may include a step for receiving, by the user device processor from the system server via a communication link, the summary in response to the request, the summary including the unique identifier and the user-identified information. The method may include a step for displaying, by the user device processor via the screen, the summary.

Additionally or alternatively, the method may include a step of performing, by the user device processor, an initial interaction with the system server via the communication link. The method may include a step of receiving, by the user device processor via the communication link, a user identifier from the system server in response to the performing the initial interaction, wherein the user identifier associates the user device with a user profile stored at the system server. The method may include a step of sending, by the user device processor, hyper-text transfer protocol (HTTP) requests to the system server via the communication link. The method may include a step of receiving, by the user device processor, requested web pages from the system server via the communication link, the requested web pages being defined in the HTTP requests. The method may include a step of determining, by the user device processor, that custom information has been input via an input device of the user device, wherein the first data set further includes the custom information, the custom information is associated with the unique identifier, and the summary includes the custom information listed under the unique identifier. A location at which the custom information is listed in the summary may be prioritized relative to the user-identified information, such that the custom information is listed above the user-identified information in the summary. The user-identified information of the summary may be linked to corresponding original information of the source document. The method may include a step for displaying, by the user device processor, the original information of the source document adjacent to the summary in a split-screen display. The method may include a step for determine, by the user device processor, that a single mouse click has been performed at an input device of the user device, wherein the request is sent in response to the single mouse click.

In another aspect, a data summary system may include a user device coupled to a communication link. The user device may include a user device memory configured to store program instructions and a user device processor configured to execute the program instructions. The program instructions, when executed, may cause the user device processor to detect selection of first user-identified information from a source document, the first user-identified information including first highlighted text. The program instructions may cause the user device processor to display a unique identifier selection box in response to the selection of the first user-identified information, the unique identifier selection box including a plurality of unique identifiers. The program instructions may cause the user device processor to detect selection of a first unique identifier from the unique identifier selection box. The program instructions may cause the user device processor to associate the first user-identified information with the first unique identifier in response to the selection of the first unique identifier. The program instructions may cause the user device processor to detect selection of second user-identified information from the source document, the second user-identified information including second highlighted text. The program instructions may cause the user device processor to display the unique identifier selection box in response to the selection of the second user-identified information. The program instructions may cause the user device processor to detect selection of a second unique identifier from the unique identifier selection box. The program instructions may cause the user device processor to associate the second user-identified information with the second unique identifier in response to the selection of the second unique identifier. The program instructions may cause the user device processor to send a first data set to a system server via the communication link, the first data set including the first and second unique identifiers, the first and second user-identified information, and a user identifier. The program instructions may cause the user device processor to send a request for generation of a summary to the system server via the communication link. The program instructions may cause the user device processor to receive the summary from the system server via the communication link in response to the request, the summary including the first and second unique identifiers and the first and second user-identified information. The program instructions may cause the user device processor to display the summary.

Additionally or alternatively, the program instructions may cause the user device processor to detect selection of third user-identified information from a second source document, the third user-identified information including third highlighted text. The program instructions may cause the user device processor to display the unique identifier selection box in response to the selection of the third user-identified information. The program instructions may cause the user device processor to detect selection of a third unique identifier from the unique identifier selection box. The program instructions may cause the user device processor to associate the third user-identified information with the third unique identifier in response to the selection of the third unique identifier. The program instructions may cause the user device processor to send a second data set to the system server via the communication link, wherein the summary further includes the third unique identifier and the third user-identified information. The summary may be organized such that the first user-identified information is listed under the first unique identifier, the second user-identified information is listed under the second unique identifier, and the third user-identified information is listed under the third unique identifier. The program instructions may cause the user device processor to detect that custom information has been input via an input device of the user device. The program instructions may cause the user device processor to associate the custom information with the first unique identifier, wherein the summary includes the custom information listed under the first unique identifier. The first user-identified information of the summary may be linked to corresponding original information of the source document The program instructions may cause the user device processor to display the original information of the source document adjacent to the summary in a split-screen display. The program instructions may cause the user device processor to determine that a single mouse click has been performed at an input device of the user device, wherein the request is sent in response to the single mouse click

BRIEF DESCRIPTION OF THE DRAWINGS

Specific examples have been chosen for purposes of illustration and description, and are shown in the accompanying drawings, forming a part of the specification.

FIG. 4 illustrates one embodiment of how a user could associate user-identified information with a unique identifier.

FIG. 5 illustrates one example of user-identified information before single-action operation.

FIG. 6 illustrates one example of a summary created by single-action operation.

DETAILED DESCRIPTION

Figure 1:
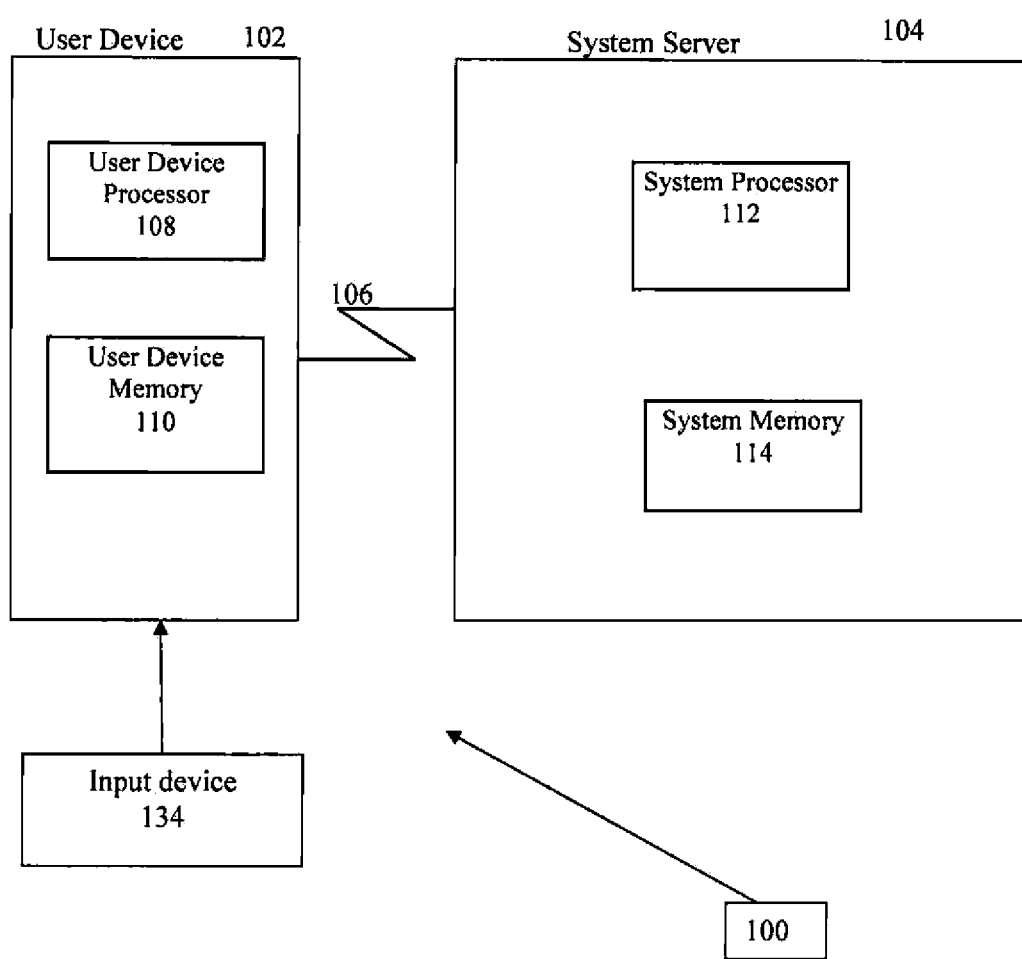
FIG. 1 illustrates a diagram of hardware system components for one example of a data summary system of the present technology.
Figure 2:
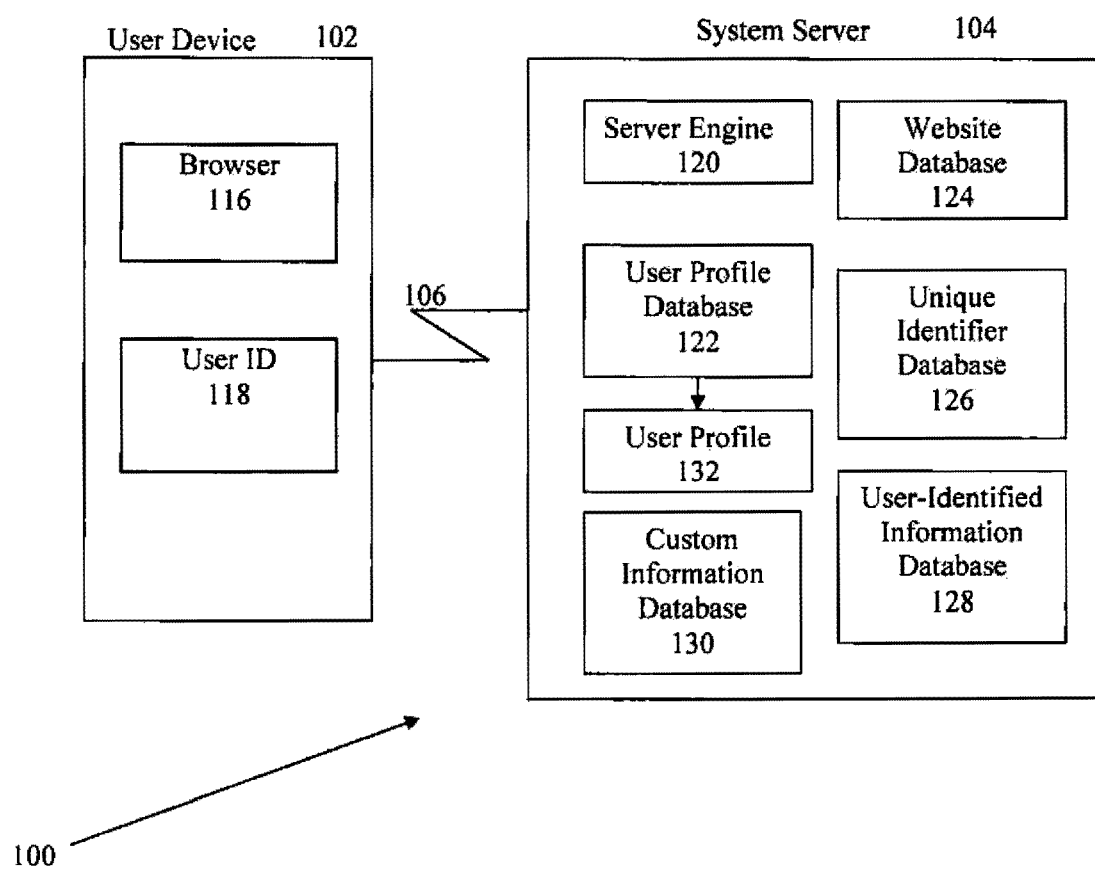
FIG. 2 illustrates a diagram of one example of software system components that can be used in the system of FIG. 1.

FIGS. 1 and 2 illustrates an embodiment of the system architecture of one example of a data summary system 100 of the present technology. As shown in FIGS. 1 and 2, the data organizing system includes at least one user device 102 and at least one system server 104, and a communication link 106, through which the user device 102 and system server 104 are operatively connected. The term "operatively connected" as used herein means that the at least one user device 102 and the at least one system server 104 can send and receive data to one another through the communication link 106. The communication link 106 can include a wired connection or a wireless connection, and can be via a local area network (LAN) connection, or via a wide area network (WAN) connection, such as the Internet.

The hardware components of each of the user device 102 and the system server 104 include at least one processor, and at least one non-transient computer readable storage medium, such as a memory. As shown in FIG. 1, the user device 102 includes at least one user device processor 108 and at least one user device memory 110, and the system server includes at least one system processor 112 and at least one system memory 114. The user device 102 can also include an input device 134, that the user can use to input commands to the user device 102, such as selection of user-identified information. The input device 134 can include one or more of a keyboard, a mouse, an electronic pointing device, a touch screen, or any other suitable device.

Examples of system architecture components of each of the user device 102 and the system server 104 are illustrated in FIG. 2.

As shown, the user device 102 includes a browser 116, which is assigned a unique user identifier 118. The user identifier 118 is an identifier that identifies the user device 102 to the server system 104. The user identifier may be stored in a file referred to as a "cookie." In one example, the server system 104 can assign and send the user identifier 118 to the user device 102 once, when the user device 102 first interacts with the server system 104. Once the user device 102 receives the user identifier 118, the user device stores the user identifier 118, such as in the user device memory 110, and provides it with every message sent to the server system 104. The server system 104, which can have communication links with any number of user devices, can thus identify the user device 102 as being the source of the message.

As also shown in FIG. 2, the system server 104 can include a server engine 120, user profile database 122 including a stored user profile 132 associated with each user identifier, a website database 124 including web pages, a unique identifier database 126, a user-identified information database 128, and a custom information database 130. Each database of the server system 104 can be stored in the system memory 114. The server engine 120 can include at least the system processor 112.

In the illustrated example, the server system 104 associates, and operatively links, each user identifier 118 with a user profile 132 stored in the user profile database 122, unique identifiers, user-identified information identified by the user device 102, and custom information received from the user device 102.

In some examples, the server engine 120 receives HTTP requests from a user device 102 to access web pages identified by URLs, and provides the requested web pages from the website database 124 to the user device 102. However, one of ordinary skill in the art would appreciate that the summary techniques described herein could be used in various environments other than the Internet. For example, the summaries could also be in an electronic mail environment. Also, a server system 104 or user device 102 may include any combination of hardware or software suitable for performing the methods described herein. For example, a user device 102 may comprise any combination of hardware or software that can interact with the server system 104. Either the user device 102 or the server system 104 can include one or more handheld devices, personal computers or television- or tablet-based systems, or various consumer computer products through which information may be generated.

Figure 3:
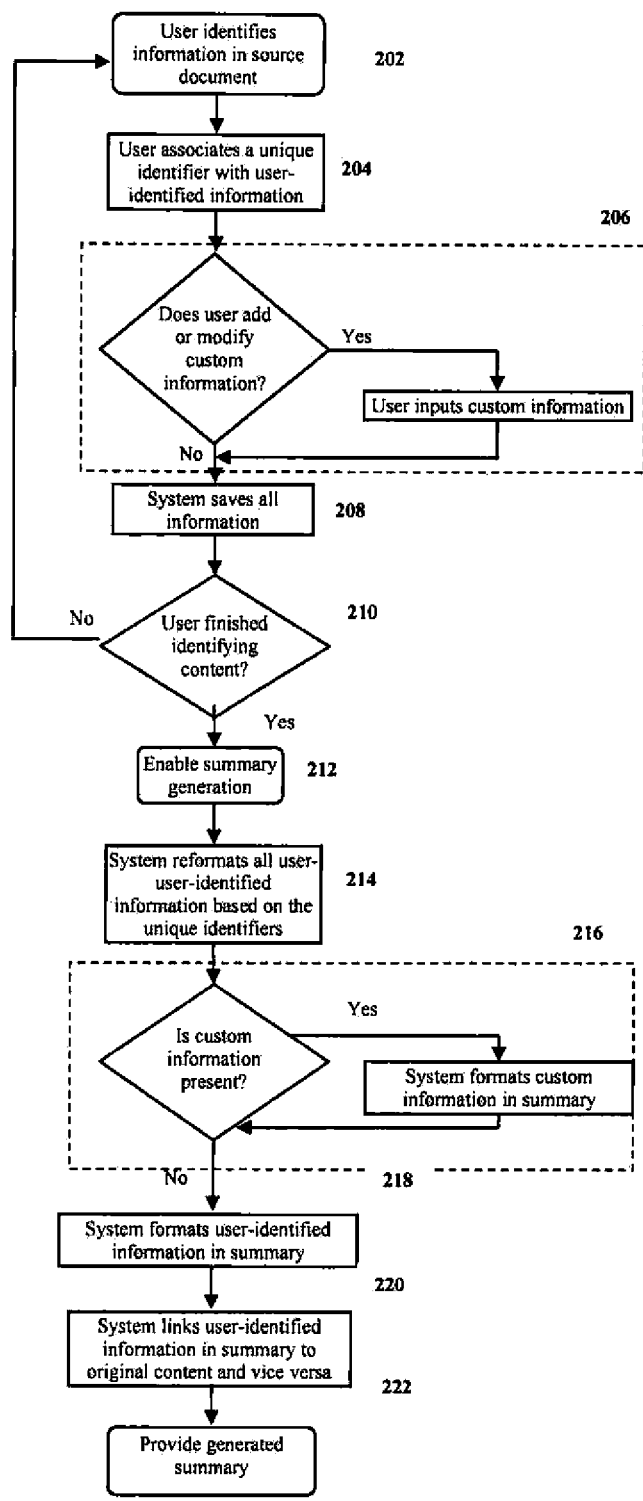
FIG. 3 illustrates a flow chart of one embodiment of a data summary method of the present technology.

FIG. 3 illustrates one example of a data summary method of the present technology. At step 202, a user uses the user device 102 to identify user-identified information in a source document. The source document can be any electronic document, such as digital text, media, web pages, or other content to be included in the summary. The user can identify the user-identified information by selecting a subset of text in a source document, such as by highlighting the text and clicking a mouse to select the text. Once the user has selected the user-identified information, the user may be prompted to associate such user-identified information with a unique identifier. At step 204, the user associates a unique identifier with the user-identified information. The user can select the unique identifier associated with the user-identified information from a plurality of predefined unique identifiers, such as a listing of unique identifiers presented in a drop-down menu. Alternatively, the unique identifiers can be customized by the user. At step 206, the summary system allows the user to input or modify additional custom information under the unique identifier. The user device 102 then sends a first data set to the server system 104 via the communication link 106. The first data set includes the user identifier 118, the user-identified information, and the unique identifier associated with the user-identified information. The server system 104 receives the first dataset, recognizes the user identifier, and stores the user-identified information in the user's profile. If the user did not input or modify additional custom information, the server system 104 saves the user-identified information under the unique identifier chosen by the user. However, if the user did modify or input custom information, the server system 104 saves the new or modified custom information, along with the user-identified information.

At step 210, the summary system determines whether the user is done creating user-identified information. If the user is not done, the method repeats steps 202 through 208, with the user selecting user-identified information from any one or more source documents, which can be the same or different from the original source document and each other. If the user has completed identifying user-identified information, the method progresses to step 212.

At step 212, the server system enables the generation of a data summary. In some examples, the user can cause the server system 104, or the user device 102, to generate the summary with a single action. For example, the user can enter a single command, such as a mouse click on a button in a selection box displayed by the user device 102, which the user device 102 sends to the system server 104, in order to cause the server system 104 to create a summary of the user-identified information and any custom information. In an example where the user device is being used offline, the user can enter the single command in order to cause the user device 102 to create a summary of the user-identified information and any custom information. If the user enters the command, summary system 100 proceeds to step 214, where the summary system 100, either through the server system 104 or the user device 102, reformats the user-identified information and the associated unique identifier, and reformats the information in order to generate a summary. Generating a summary includes prioritizing and formatting the information received from the user. For example, if custom information is present under a unique identifier, the summary system 100 can format the custom information in the summary, including prioritizing the custom information relative to, such as above or below, the user-identified information for any given unique identifier at step 216. Additionally, at step 218, the system formats the user-identified information into the summary. In generating the summary, the summary system 100 can link the summarized information to the original information and vice versa at step 220. Finally, at step 222, the summary system 100 can provide the generated summary to the user. If the server system 104 generated the summary, the summary can be provided to the user by sending the generated summary to the user device 102 via the communication link 106.

In examples where the user can cause the summary to be generated with a single action, once the user initiates the single-action (via a mouse click, keystroke, or otherwise), the system generates a formatted summary. The summary system 100 can also allow the user to modify the generated summary. In general, the user need only enter the user-identified information, and any custom information, under each unique identifier, and then execute the single action in order to generate a summary. Such systems can allow the user to efficiently and reliably generate a summary of digital text, media, web pages, or other content.

In alternative examples, a multi-action operation can be used, which can include defining a custom summary format through multiple mouse clicks and/or keystrokes prior to generating the summary.

FIG. 4 illustrates one embodiment of how the user can assign a unique identifier 300 to a selection of user-identified information 302. In this example, once the user-identified information 302 is selected by the user, a unique identifier selection box 304 is displayed by the user device 102, providing the user with various predefined or common unique identifiers 300. These may include, as examples only, Fact, Issue, Procedure, Reasoning, Rule, Holding, Notes. The user can then select the unique identifier 300 to be associated with the user-identified information 302 through a single action (via a mouse click or otherwise) or multiple actions. Once a particular unique identifier 300 is selected by the user (via a mouse click or otherwise), the summary system 100 associates that unique identifier 300 with the particular selection of user-identified information 302, and saves such association for possible further processing. The summary system 100 can allow the user to modify and customize the unique identifiers 300 and the unique identifier selection box 304.

FIG. 5 illustrates one example of content where the user has identified user-identified information 400, and associated the user-identified information 400 with unique identifiers 402 and the system has saved such information under the user's profile. In some instances, the user has input custom information 404 under the unique identifiers. The summary system 100 stores the user-identified information 400, the unique identifiers 402, and the custom information 404 in the system server 104 in association with the user identifier 118.

FIG. 6 illustrates one example of a summary 500 generated by the system server 104 of the summary system 100. The summary 500 includes a listing of each unique identifier 502. Under each unique identifier 502, any custom information 504 and user-identified information 506 associated with the unique identifier 502 are listed. The custom information 504 is illustrated as being prioritized over the user-identified information 506 for each unique identifier 502. The system can, however, be customized to prioritize custom and user-identified information in any order.

Figure 7:
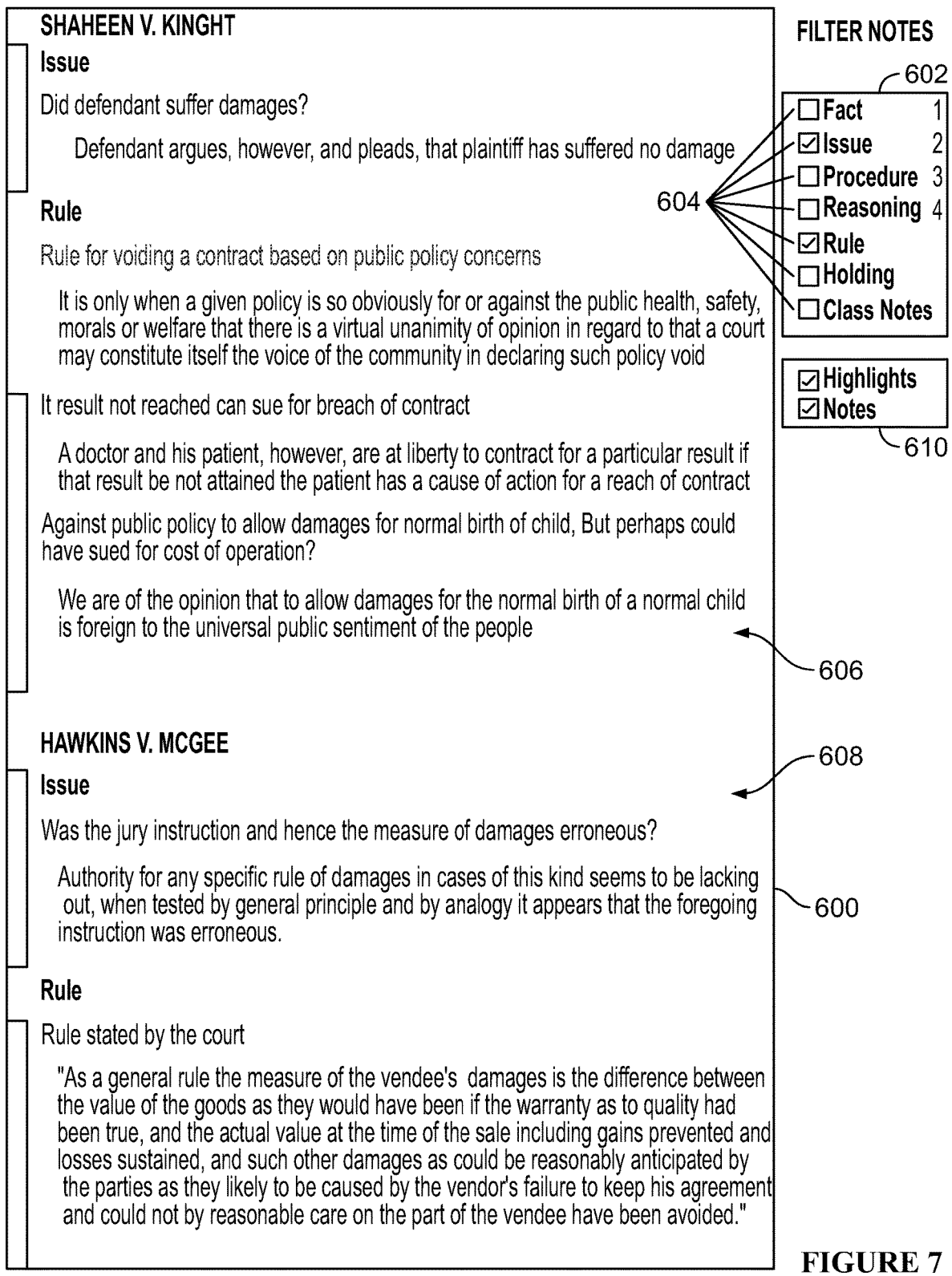
FIG. 7 illustrates one embodiment of how a user can aggregate, manipulate, and distinguish information from multiple summaries.

The summary system 100 can also aggregate multiple summaries, and allow the user to view user-identified information and/or custom information by unique identifier across multiple summaries. FIG. 7 illustrates one example of how multiple summaries 600 can be aggregated and how unique identifiers can be used to filter and/or distinguish information from multiple summaries. In this example, a unique identifier activation box 602 is used to allow the user to select desired unique identifiers 604, by checking the indicated selection box(es). The summary system 100 generates a display of all of the user-identified information 606 and custom information 608 associated with the selected unique identifiers 602. An information type selection box 610 can be used to display user-identified information 606, custom information 608, or both. In this example, the information type selection box 610 differs from the unique identifier activation box 602 in that the information type selection box 610 allows the user to choose to display either user-identified information 606 or custom information 608, or both, across multiple summaries, while the unique identifier activation box 602 allows the user to choose to display information (either user-identified information 606 or custom information 608, or both) associated with certain unique identifiers (and exclude others) across multiple summaries 600. Thus, a compilation of summaries can be created by the summary system 100.

Figure 8:
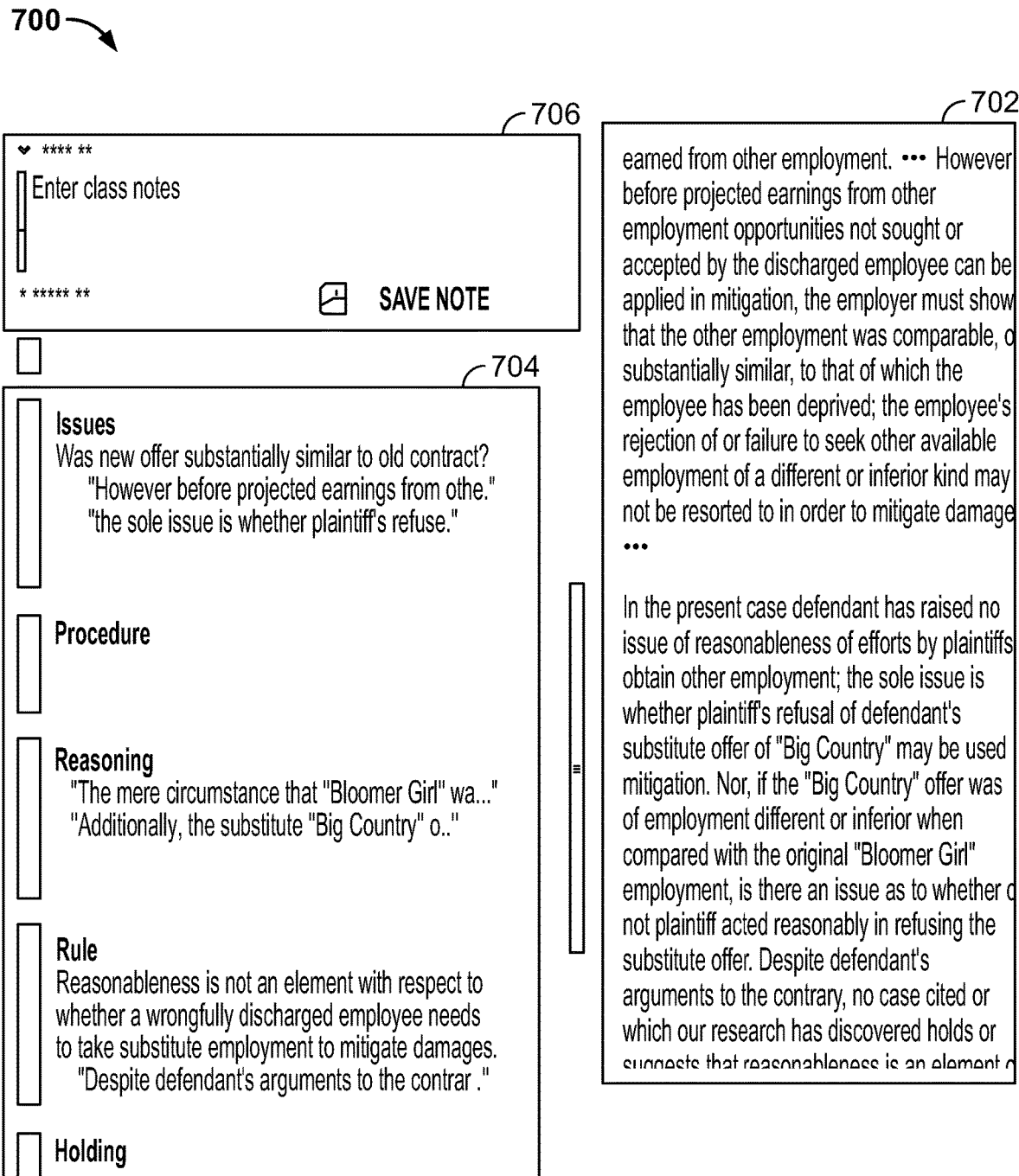
FIG. 8 illustrates a merged view showing one embodiment of the linking between FIGS. 1 & 2.

FIG. 8 illustrates an integrated view of source document 702 and a summary 704 in a split-screen display 700. The source document 702 includes the original digital text, media, web pages, or other content. As shown, the summary system can link the summarized information to the original information in the source document, and vice versa. This example also includes a notes area 706, for the user to input additional information.

Figure 9:
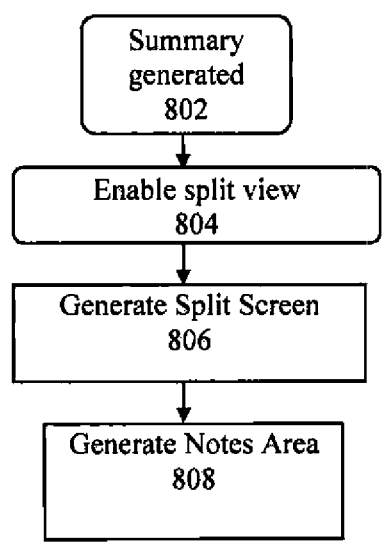
FIG. 9 illustrates a flow chart of one embodiment of the merging summary data with original content.

FIG. 9 is a flow diagram of a process for generating the split screen view of FIG. 8. At step 802, the server system 104 generates the summary, which can be in accordance with the process illustrated in FIG. 3. At step 804, the summary system enables the user to select a split view, such as by displaying a selection box to the user via the user device and sending a user selection to the system server 104. At step 806, the split screen is generated by the server system 104, and sent to the user device 102 to be displayed to the user. In generating the split screen, the summary system 100 can maintain the links between the source document and the user-identified information. Additionally, at step 808, the summary system can also generate the notes area 706, which can be sent to the user device 102 to be displayed to the user, where the user can input additional information.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A data summary system comprising:
a user device coupled to a communication link, the user device comprising:
a user device processor configured to execute program instructions, which, when executed, cause the user device processor to:
detect selection of user-identified information from a source document, the user-identified information including highlighted text;
display a unique identifier selection box in response to the selection of the user-identified information, the unique identifier selection box including a plurality of unique identifiers;
detect selection of a unique identifier from the unique identifier selection box;
in response to the selection of the unique identifier, compile the user-identified information into a first data set that includes a first association between the user-identified information and the unique identifier, a user identifier, and a document identifier of the source document;
send a request to the system server via the communication link directing the system server to generate a summary of the source document from the first data set;
receive the summary from the system server via the communication link in response to the request, the summary including the unique identifier and the user-identified information reformatted based on the unique identifier; and
display the summary.

2. The data summary system of claim 1, wherein the program instructions, when executed, further cause the user device processor to:
perform an initial interaction with the system server via the communication link; and
receive the user identifier from the system server in response to performing the initial interaction, wherein the user identifier associates the user device with a user profile stored at the system server.

3. The data summary system of claim 1, wherein the program instructions, when executed, further cause the user device processor to:
send hyper-text transfer protocol (HTTP) requests to the system server via the communication link; and
receive requested web pages from the system server via the communication link, the requested web pages being defined in the HTTP requests.

4. The data summary system of claim 1, wherein the program instructions, when executed, further cause the user device processor to:
determine that custom information has been input via an input device of the user device; and
compile the custom information into the first data set along with a second association between the custom information and the unique identifier, the user identifier, and the identifier of the source document, and wherein the summary includes the custom information reformatted such that the custom information is listed relative to the unique identifier.

5. The data summary system of claim 4, wherein a location at which the custom information is listed in the summary is prioritized relative to the user-identified information in a reformatted presentation relative to the user-identified information in the summary.

6. The data summary system of claim 1, wherein the user-identified information of the summary is linked to corresponding original information of the source document, wherein the program instructions, when executed, further cause the user device processor to:
display the original information of the source document adjacent to the summary in a split-screen display.

7. The data summary system of claim 1, wherein the program instructions, when executed, further cause the user device processor to:
determine that a single mouse click has been performed at an input device of the user device, wherein the request is sent in response to the single mouse click.

8. A method comprising:
detecting, by a user device processor of a user device, selection of user-identified information from a source document, the user-identified information including highlighted text;
in response to the selection of the user-identified information, compiling the user-identified information into a first data set that includes a first association between the user-identified information, a user identifier, and a document identifier of the source document;

displaying, by the user device processor, an information selection box in response to the selection of the user-identified information, the information selection box including a filter;

detecting, by the user device processor, selection of the filter from the information selection box;

sending, by the user device processor, the first data set to a system server via a communication link;

sending, by the user device processor, a request to the system server via the communication link, to generate a summary of the source document from stored information associated with the first data set;

receiving, by the user device processor from the system server via a communication link, the summary in response to the request, the summary including the user-identified information in a reformatted presentation based on the filter; and displaying, by the user device processor via a screen, the summary.

9. The method of claim 8, further comprising:

performing, by the user device processor, an initial interaction with the system server via the communication link; and receiving, by the user device processor via the communication link, the user identifier from the system server in response to the performing the initial interaction, wherein the user identifier associates the user device with a user profile stored at the system server.

10. The method of claim 8, further comprising:

sending, by the user device processor, hyper-text transfer protocol (HTTP) requests to the system server via the communication link; and receiving, by the user device processor, requested hyperlinks from the system server via the communication link, the requested hyperlinks being defined in the HTTP requests.

11. The method of claim 8, further comprising:

determining, by the user device processor, that custom information has been input via an input device of the user device; and compiling the custom information into the first data set along with a second association between the custom information, the user identifier, and the identifier of the source document, and wherein the summary is reformatted to include the custom information when the filter associated with the custom information is selected in the information selection box.

12. The method of claim 11, wherein a location at which the custom information is listed in the summary is prioritized relative to the user-identified information in the reformatted summary according to a user selection.

13. The method of claim 8, wherein the user-identified information of the summary is linked to corresponding original information of the source document, the method further comprising:

displaying, by the user device processor, the original information of the source document adjacent to the summary in a split-screen display.

14. The method of claim 8, further comprising:

determine, by the user device processor, that a single mouse click has been performed at an input device of the user device, wherein the request is sent in response to the single mouse click.

* * * * *